US010425953B2

(12) United States Patent
Sung (10) Patent No.: US 10,425,953 B2
(45) Date of Patent: Sep. 24, 2019

(54) HOST DEVICE PREVENTING DISTORTION OF OPTICAL SIGNAL DUE TO NONLINEAR NOISE, AND DISTRIBUTED ANTENNA SYSTEM INCLUDING THE HOST DEVICE

(71) Applicant: ELECTRONICS AND TELECOMMUNICATIONS RESEARCH INSTITUTE, Daejeon (KR)

(72) Inventor: Minkyu Sung, Seoul (KR)

(73) Assignee: ELECTRONICS AND TELECOMMUNICATION RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/190,785

(22) Filed: Nov. 14, 2018

(65) Prior Publication Data

US 2019/0166602 A1 May 30, 2019

(30) Foreign Application Priority Data

Nov. 29, 2017 (KR) ........................ 10-2017-0161260

(51) Int. Cl.
| H04J 4/00 | (2006.01) |
| H04W 72/08 | (2009.01) |
| H04B 10/2575 | (2013.01) |
| H04J 14/00 | (2006.01) |
| H04W 72/04 | (2009.01) |

(Continued)

(52) U.S. Cl.
CPC ...... *H04W 72/082* (2013.01); *H04B 10/2507* (2013.01); *H04B 10/25751* (2013.01); *H04B 10/25758* (2013.01); *H04J 14/00* (2013.01);

*H04W 72/0453* (2013.01); *H04B 2210/006* (2013.01); *H04B 2210/25* (2013.01); *H04W 88/085* (2013.01)

(58) Field of Classification Search
CPC .......... H04B 10/2507; H04B 10/25751; H04B 10/25758; H04B 2210/006; H04B 2210/25; H04B 1/62; H04B 1/0475; H04B 2001/0425; H04J 14/00; H04W 72/082; H04W 72/0453; H04W 88/085; H03F 1/3241
USPC ........................... 398/76, 68, 70, 71, 79, 69
See application file for complete search history.

(56) References Cited

U.S. PATENT DOCUMENTS 4,561,111 A * 12/1985 Conner .................... H03C 1/06
455/47
6,408,079 B1 * 6/2002 Katayama .............. H03G 5/005
381/96

(Continued)

FOREIGN PATENT DOCUMENTS

KR    10-2006-0044429 A    5/2006
KR    10-2009-0132622 A    12/2009

*Primary Examiner* — Hibret A Woldekidan
(74) *Attorney, Agent, or Firm* — LRK Patent Law Firm (57) ABSTRACT

A host device uses an intermediate frequency determined based on frequencies of a second-order nonlinear intermodulation distortion component and a harmonic component which are generated in an analog optical link connected to the host device, for example, an analog optical link of a distributed antenna system (DAS), and precompensates for the second-order nonlinear intermodulation distortion component and the harmonic component generated in the analog optical link.

11 Claims, 6 Drawing Sheets

(51) Int. Cl.
*H04B 10/2507* (2013.01)
*H04W 88/08* (2009.01)

(56) References Cited

U.S. PATENT DOCUMENTS

| | | | | |
|---|---|---|---|---|
| 7,821,337 | B2* | 10/2010 | Yamanouchi | H03F 1/3223 |
| | | | | 330/124 R |
| 8,396,368 | B2* | 3/2013 | Tarlazzi | H04B 7/0413 |
| | | | | 398/115 |
| 8,744,363 | B2* | 6/2014 | Dufrene | H04B 1/1036 |
| | | | | 455/296 |
| 8,817,848 | B2* | 8/2014 | Lemson | H04B 10/25753 |
| | | | | 375/211 |
| 8,843,082 | B2* | 9/2014 | Dufrene | H04B 1/525 |
| | | | | 370/277 |
| 9,178,636 | B2* | 11/2015 | Fischer | H04J 3/00 |
| 10,020,890 | B2* | 7/2018 | Cho | H04B 10/40 |
| 10,128,918 | B2* | 11/2018 | Fischer | H04J 3/00 |
| 10,141,961 | B1* | 11/2018 | Huang | H04B 1/0475 |
| 2011/0156815 | A1* | 6/2011 | Kim | H03F 1/304 |
| | | | | 330/149 |
| 2013/0302029 | A1 | 11/2013 | Lee et al. | |
| 2016/0049966 | A1* | 2/2016 | Wang | H04B 1/0064 |
| | | | | 455/561 |
| 2016/0112139 | A1 | 4/2016 | Tanaka et al. | |
| 2017/0244486 | A1* | 8/2017 | Han | H04B 10/2513 |
| 2017/0311380 | A1* | 10/2017 | Zavadsky | H04W 88/085 |
| 2018/0152248 | A1* | 5/2018 | Sung | H04B 10/25753 |
| 2019/0124648 | A1* | 4/2019 | Sun | H04W 16/04 |

* cited by examiner

HOST DEVICE PREVENTING DISTORTION OF OPTICAL SIGNAL DUE TO NONLINEAR NOISE, AND DISTRIBUTED ANTENNA SYSTEM INCLUDING THE HOST DEVICE

CROSS-REFERENCE TO RELATED APPLICATION(S)

This application claims the priority benefit of Korean Patent Application No. 10-2017-0161260, filed Nov. 29, 2017, in the Korean Intellectual Property Office, the disclosure of which is incorporated herein by reference for all purposes.

BACKGROUND

1. Field

One or more example embodiments relate to a network system using an optical signal.

2. Description of Related Art

As the use of massive mobile contents increases through a 4 kilo-pixel (K) video streaming service, data traffic required for a mobile communication system is explosively increasing. To accommodate the increased data traffic, a small cell-based cloud radio access network (C-RAN) is deployed. Most of the increased data traffic may be mobile data traffic that is generated from terminals deployed indoors.

SUMMARY

An aspect provides a distributed antenna system (DAS) that provides a mobile communication service to a terminal present indoors.

Another aspect provides a DAS that effectively accommodates data traffic of terminals present indoors using an analog optical link.

Still another aspect provides a DAS and a host device included in the DAS that use an intermediate frequency set to prevent a distortion of an optical signal by nonlinear noise generated in an analog optical link.

Yet another aspect provides a host device that precompensates for nonlinear noise generated in an analog optical link.

According to an aspect, there is provided a method of processing an analog electrical signal to be performed by a host device connected to remote radio heads (RRHs), the method including receiving analog electrical signals respectively from the RRHs, allocating, to an intermediate frequency, the analog electrical signals by intermediate frequency converters respectively corresponding to the RRHs, multiplexing, by a channel aggregator, the analog electrical signals allocated to the intermediate frequency, performing, by a precompensator, a precompensation on an analog electrical signal obtained through the multiplexing to remove a second-order nonlinear intermodulation distortion component and a harmonic component with a frequency greater than or equal to the intermediate frequency which are generated in an analog optical link connected to the host device, and converting, by an analog optical transmitter, an analog electrical signal obtained through the precompensation to an analog optical signal to be output to the analog optical link.

The performing of the precompensation may include obtaining the second-order nonlinear intermodulation distortion component and the harmonic component from the multiplexed analog electrical signal by distributing the multiplexed analog electrical signal to different signal paths.

The performing of the precompensation may include amplifying the multiplexed analog electrical signal by a signal amplifier, obtaining, by a squaring processor, the second-order nonlinear intermodulation distortion component and the harmonic component corresponding to the multiplexed analog electrical signal, and subtracting, by a subtraction processor, the second-order nonlinear intermodulation component and the harmonic component from the amplified analog electrical signal.

The intermediate frequency may be set to correspond to each of the analog electrical signals and be determined based on a frequency space between the analog electrical signals, a bandwidth of each of the analog electrical signals, and a smallest center frequency among center frequencies of the analog electrical signals.

According to another aspect, there is provided a method of processing an analog electrical signal to be performed by a host device connected to, the method including receiving analog electrical signals respectively from the RRHs, allocating, to an intermediate frequency, the analog electrical signals by intermediate frequency converters respectively corresponding to the RRHs, multiplexing the analog electrical signals allocated to the intermediate frequency by a channel aggregator, converting, by an analog-to-digital converter (ADC), an analog electrical signal obtained through the multiplexing to a digital electrical signal, performing, by a precompensator, a precompensation on the digital electrical signal to remove a second-order nonlinear intermodulation distortion component and a harmonic component with a frequency greater than or equal to the intermediate frequency which are generated in an analog optical link connected to the host device, converting, by a digital-to-analog converter (DAC), a digital electrical signal obtained through the precompensation to an analog electrical signal, and converting, by an analog optical transmitter, the analog electrical signal obtained through the converting to an analog optical signal to be output to the analog optical link.

The performing of the precompensation may include obtaining the second-order nonlinear intermodulation distortion component and the harmonic component from the digital electrical signal by distributing the digital electrical signal to different signal paths.

The performing of the precompensation may include amplifying the digital electrical signal by a signal amplifier, obtaining, by a squaring processor, the second-order nonlinear intermodulation distortion component and the harmonic component corresponding to the digital electrical signal, and subtracting, by a subtraction processor, the second-order nonlinear intermodulation distortion component and the harmonic component from the amplified digital electrical signal.

The intermediate frequency may be set to correspond to each of the analog electrical signals and be determined based on a frequency space between the analog electrical signals, a bandwidth of each of the analog electrical signals, and a smallest, center frequency among center frequencies of the analog electrical signals.

According to still another aspect, there is provided a host device connected to RRHs, the host device including intermediate frequency converters respectively corresponding to the RRHs, and each configured to convert a frequency of an analog electrical signal received from a corresponding RRH of the RRHs to an intermediate frequency corresponding to the RRH, a channel aggregator configured to multiplex analog electrical signals output from the intermediate frequency converters, a precompensator configured to perform a precompensation on an analog electrical signal obtained through the multiplexing to remove a second-order nonlinear intermodulation distortion component and a harmonic component with a frequency greater than or equal to the intermediate frequency which are generated in an analog optical link connected to the host device, and an analog optical transmitter configured to convert an analog electrical signal obtained through the precompensation to an analog optical signal to be output to the analog optical, link.

The precompensator may include a signal amplifier configured to amplify the multiplexed analog electrical signal, a squaring processor configured to obtain the second-order nonlinear intermodulation distortion component and the harmonic component corresponding to the multiplexed analog electrical signal, and a subtraction processor configured to subtract the second-order nonlinear intermodulation distortion component and the harmonic component from the amplified analog electrical signal.

The intermediate frequency may be set to correspond to each of the analog electrical signals and be determined based on a frequency space between the analog electrical signals, a bandwidth of each of the analog electrical signals, and a smallest center frequency among center frequencies of the analog electrical signals.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Terms such as first, second, A, B, (a), (b), and the like may be used herein to describe components. Each of these terminologies is not used to define an essence, order, or sequence of a corresponding component but, used merely to distinguish the corresponding component from other component(s). For example, a first component may be referred to as a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure and are not to be interpreted in an idealized or overly formal sense unless expressly so defined herein.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings.

Figure 1:
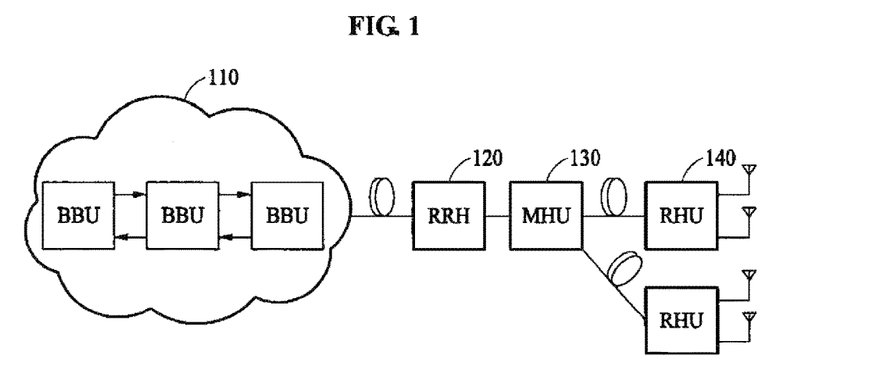
FIG. 1 is a diagram illustrating an example of a structure of a distributed antenna system (DAS) according to an example embodiment.

FIG. 1 is a diagram illustrating an example of a structure of a distributed antenna system (DAS) according to an example embodiment. A DAS may accommodate mobile data traffic generated indoors. The DAS may reasonably provide a mobile communication service to an indoor environment, such as, for example, a building and a tunnel, without a shadow area. The DAS may use, an intermediate frequency between a radio frequency of a radio signal and a base frequency. A volume of data traffic required by the DAS may correspond to a bandwidth of a baseband mobile communication signal. When the volume of the data traffic required by the DAS corresponds to the bandwidth of the baseband, mobile communication signal, costs involved in constructing and operating a network may be reduced.

Referring to FIG. 1, a plurality of baseband units (BBUs) 110 connected to a core network of a service provider providing various information communication services through a network may be connected to a DAS. The baseband units 110 may be included in a single BBU pool. The BBUs 110 may generate a baseband optical signal. The BBUs 110 may be included in a central office (CO) in which a communication device used to provide a network subscriber with an information communication service is installed.

The DAS includes at least one remote radio head (RRH) 120 to be connected to the BBUs 110 through an optical distribution network (ODN). The ODN may include an optical fiber as a transmission medium. For example, when a plurality of RRHs is connected, the ODN may include an optical splitter configured to distribute, to the RRHs, optical signals of the BBUs 110 being equal in strength.

The DAS includes a mobile host unit (MHU) 130 to be connected to the RRH 120. The MHU 130 may convert a baseband electrical signal output from the RRH 120 to an analog electrical signal indicating data by an analog waveform of a radio signal which may be received by a user terminal. The analog electrical signal may be an electrical signal having an intermediate frequency. The analog electrical signal may be converted to an analog optical signal and then to be output to an analog optical link included in the DAS.

The DAS includes a remote host unit (RHU) 140 to be connected to the MHU 130. The RHU 140 may convert the analog optical signal to a radio signal to be provided to a user. As described above, the MHU 130 and the RHU 140 may be connected through the analog optical link. As the analog optical signal of the MHU 130 proceeds in the analog optical link, the analog optical signal may be distorted by nonlinear noise.

When, in the analog optical link, the analog optical signal is combined with a second-order nonlinear intermodulation distortion component and a harmonic component with a frequency greater than or equal to that of the analog optical signal, the nonlinear noise may be generated. Such nonlinear noise may be generated by an interaction between dispersion and overlapping of optical signals in an optical link. The nonlinear noise may also be generated in a radio frequency (RF) device, such as, for example, an RF amplifier configured to process RF signals of the MHU 130 and the RHU 140. According to an example embodiment, the MHU 130 and the RHU 140 may precompensate, or compensate in advance, for the nonlinear noise generated in the analog optical link. That is, the analog optical signal propagated in the analog optical link may include a frequency component that compensates for the nonlinear noise generated in the analog optical link. Further, the DAS may use, as an intermediate frequency, a remaining frequency, excluding ones in a frequency range in which the second-order nonlinear intermodulation distortion component and the harmonic component with the frequency greater than or equal to that of the analog optical signal are combined, to prevent or avoid a distortion of the analog optical signal that may occur due to the nonlinear noise.

Figure 2:
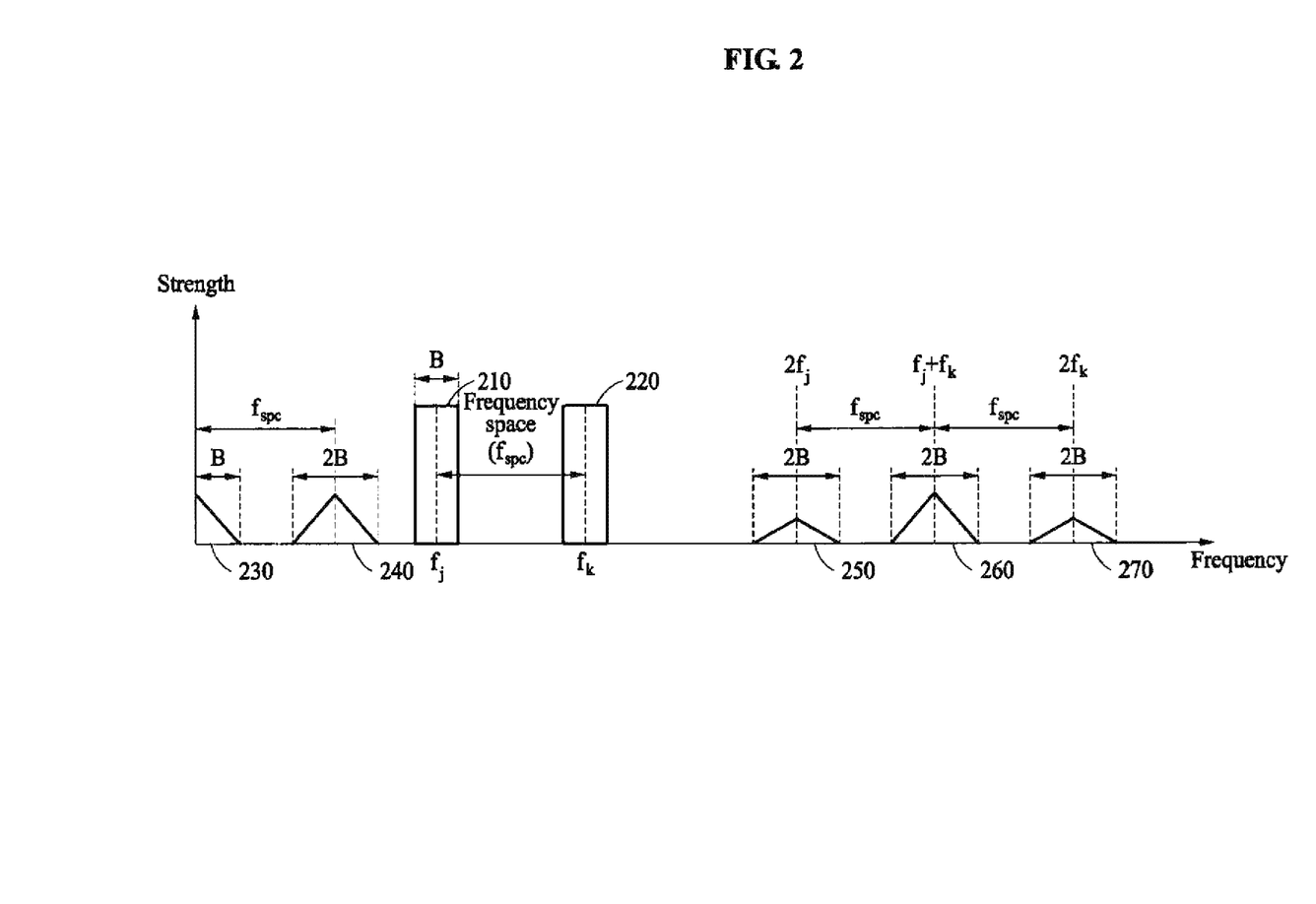
FIG. 2 is a graph illustrating an example of an intermediate frequency used by a DAS based on a frequency component of nonlinear noise according to an example embodiment.

FIG. 2 is a graph illustrating an example of an intermediate frequency used by a DAS based on a frequency component of nonlinear noise according to an example embodiment.

An analog electrical signal to be received by a host device such as an MHU and an RHU of a DAS from an RRH may include a modulation signal, for example, an analog electrical signal, having different N frequencies. The host device may convert an analog electrical signal with a frequency to an analog optical signal in an intermediate frequency range. The analog optical signal obtained through the converting may be transmitted through an analog optical link. The analog optical signal may include N intermediate frequency components respectively corresponding to respective frequencies of the N modulation signals included in the analog electrical signal. Hereinafter, frequencies of the N intermediate frequency components will be denoted by $f_1, f_2, \ldots, f_N$ in sequential order starting from a smallest frequency.

A second-order nonlinear intermodulation distortion component and a harmonic component may be generated by an intermediate frequency component included in the analog optical signal. With respect to the frequencies $f_1$ through $f_N$ of the intermediate frequency components included in the analog optical signal, a frequency $f_{dist}$ of the second-order nonlinear intermodulation distortion component and the harmonic component with the frequency greater than or equal to that of the analog optical signal may be determined as represented by Equation 1.

$$(m-1)f_{spc}-B<f_{dist}<(m-1)f_{spc}+B(f_j-f_k \text{ component},$$
$$m=1,2,\ldots,N), 2f_1+(m-1)f_{spc}-<B<f_{dist}<2f_1+$$
$$(m-1)f_{spc}+B(f_j+f_k \text{ component}, m=1,2,\ldots,$$
$$2N-1) \quad \text{[Equation 1]}$$

In Equation 1, $f_j$ and $f_k$ may be included in the frequencies $f_1$ through $f_N$ of the intermediate frequency components. In Equation 1, $f_1$ is a frequency of a smallest component among the N intermediate frequency components included in the analog optical signal. In addition, B denotes a signal bandwidth of an intermediate frequency component, and $f_{spc}$ denotes a frequency space between the intermediate frequency components.

Referring to FIG. 2, the intermediate frequency components included in the analog optical signal include a $f_j$ intermediate frequency component 210 with a frequency $f_j$ and a $f_k$ intermediate frequency component 220 with a frequency $f_k$. In the example illustrated in FIG. 2, second-order nonlinear intermodulation distortion components 230 and 240 are generated as nonlinear distortions occurring from the $f_j$ intermediate frequency component 210 and the $f_k$ intermediate frequency component 220. Referring to Equation 1 above, the second-order nonlinear intermodulation distortion components 230 and 240 may be $f_j-f_k$ components which include frequency components from a frequency component $-B<f_{dist}<+B$ when m is 1 (m=1) to a frequency component $(N-1)f_{spc}-B<f_{dist}<(N-1)f_{spc}+B$ when, m is N (m=N). That is, a frequency range in which the second-order nonlinear intermodulation distortion components 230 and 240 are generated may be from $-B$ or greater to $(N-1)f_{spc}+B$ or less.

In the example illustrated in FIG. 2, harmonic components 250, 260, and 270 are also generated as nonlinear distortions occurring from the $f_j$ intermediate frequency component 210 and the $f_k$ intermediate frequency component 220. Referring to Equation 1 above, the harmonic components 250, 260, and 270 may be $f_j+f_k$ components which include frequency components from a frequency component $2f_1-B<f_{dist}<2f_1+B$ when m is 1 (m=1) to a frequency component $2f_1+(2N-2)f_{spc}-B<f_{dist}<2f_1+(2N-2)f_{spc}+B$ when m is 2N-1 (m=2N-1). That is, a frequency range in which the harmonic components 250, 260, and 270 are generated may be from $2f_1-B$ or greater to $2f_1+(2N-2)f_{spc}+B$ or less.

The host device may use a relationship between an intermediate frequency of the analog optical signal, and the second-order nonlinear intermodulation distortion components 230 and 240 and the harmonic components 250, 260, and 270 to allocate the intermediate frequency of the analog optical signal to a remaining frequency range excluding the frequency ranges in which the second-order nonlinear intermodulation distortion components 230 and 240 and the harmonic components 250, 260, and 270 are generated. In addition, the host device may combine the analog optical signal with a frequency component that compensates for the second-order nonlinear intermodulation distortion components 230 and 240 and the harmonic components 250, 260, and 270, and thus compensate, in advance, the second-order nonlinear intermodulation distortion components 230 and 240 and the harmonic components 250, 260, and 270 which are generated in the analog optical link, for example, a link of the DAS.

Figure 3:
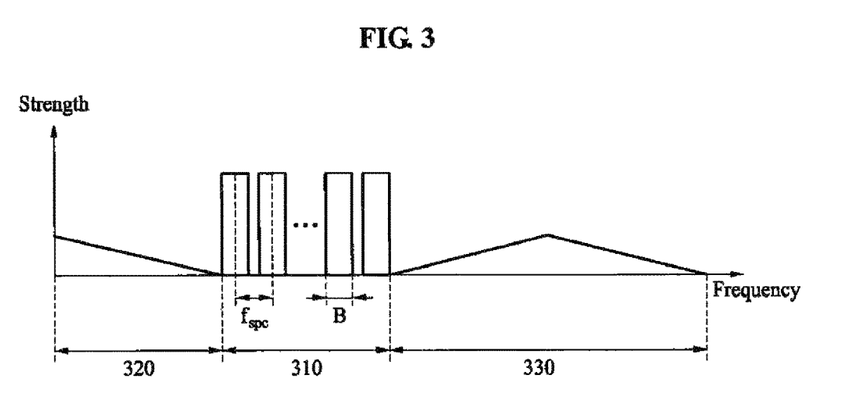
FIG. 3 is a graph illustrating an example of an intermediate frequency component of, an analog optical signal generated from a modulation signal received by a host device from a remote radio head (RRH) according to an example embodiment.

FIG. 3 is a graph illustrating an example of an intermediate frequency component of an analog optical signal generated from a modulation signal received by a host device from an RRH according to an example embodiment.

Referring to FIG. 3, a host device may allocate, to a frequency range 310, N intermediate frequency components respectively corresponding to N modulation signals received from RRHs. The N intermediate frequency components may each have a signal bandwidth B, and be separated from each other by a same frequency space $f_{spc}$. Thus, a magnitude of the frequency range 310 may be at least $(N-1)f_{spc}+B$.

In the example illustrated in FIG. 3, the frequency range 310 to which the intermediate frequency components are to be allocated by the host device may be between a frequency range 320 including a second-order nonlinear intermodulation distortion component and a frequency range 330 including a harmonic component. Thus, a minimum frequency of the frequency range 310 may be greater than or equal to a maximum frequency of the frequency range 320 including the second-order nonlinear intermodulation distortion component, and a maximum frequency of the frequency range 310 may be less than or equal to a minimum frequency of the frequency range 330 including the harmonic component.

As described above, since a frequency range in which a second-order nonlinear intermodulation distortion component is generated is from −B or greater to $(N-1)f_{spc}+B$ or less, the maximum frequency of the frequency range 320 may be $(N-1)f_{spc}+B$. That is, in a positive frequency domain, a magnitude of the frequency range 320 including the second-order nonlinear intermodulation distortion component may correspond to the magnitude of the frequency range 310. In addition, the minimum frequency of the frequency range 310 may be $(N-1)f_{spc}+B$.

As described above, since a frequency range in which a harmonic component is generated is from $2f_1-B$ or greater to $2f_1+(2N-2)f_{spc}+B$ or less, the minimum frequency of the frequency range 330 may be $2f_1-B$. Thus, the maximum frequency of the frequency range 310 may be $2f_1-B$. In addition, a magnitude of the frequency range 330 may be $(2N-2)f_{spc}+2B=2\times((N-1)f_{spc}+B)$, which may be two times the magnitude of the frequency range 310.

For example, when frequencies of the N intermediate frequency components included in the analog optical signal are $f_1, f_2, \ldots, f_N$ in sequential order starting from a smallest frequency, the minimum frequency of the frequency range 310 may be $f_1-B/2$ and the maximum frequency of the frequency range 310 may be $f_N+B/2=f1+(N-1)f_{spc}+B/2$. In addition, using the minimum frequency $f_1-B/2$ of the frequency range 310 and the maximum frequency $f_1+(N-1)f_{spc}+B/2$ of the frequency range 310, a condition for the frequency range 310 to be included, between the frequency range 320 and the frequency range 330 may be represented by Equation 2.

$$(N-1)f_{spc}+B<f_1-B/2, \text{ (for } f_j-f_k)$$

$$f_1+(N-1)f_{spc}+B/2<2f_1-B, \text{ (for } f_j+f_k) \quad \text{[Equation 2]}$$

Equation 2 may be arranged as represented by Equation 3.

$$(N-1)fspc+B+B/2<f_1 \quad \text{[Equation 3]}$$

When the N intermediate frequency components are separated by the same frequency space $f_{spc}$, the magnitude of the frequency range 310, for example, a total bandwidth of the analog optical signal, may be $(N-1)f_{spc}+B$. The total bandwidth of the analog optical signal may be determined as represented by Equation 4.

$$\text{Total BW}+B/2<f_1 \quad \text{[Equation b 4]}$$

The host device may allocate, to the frequency range 310 satisfying Equation 4, the intermediate frequency components respectively corresponding to the modulation signals received from the RRHs such that the intermediate frequency components do not overlap the second-order nonlinear intermodulation distortion component and the harmonic component.

Figure 4:
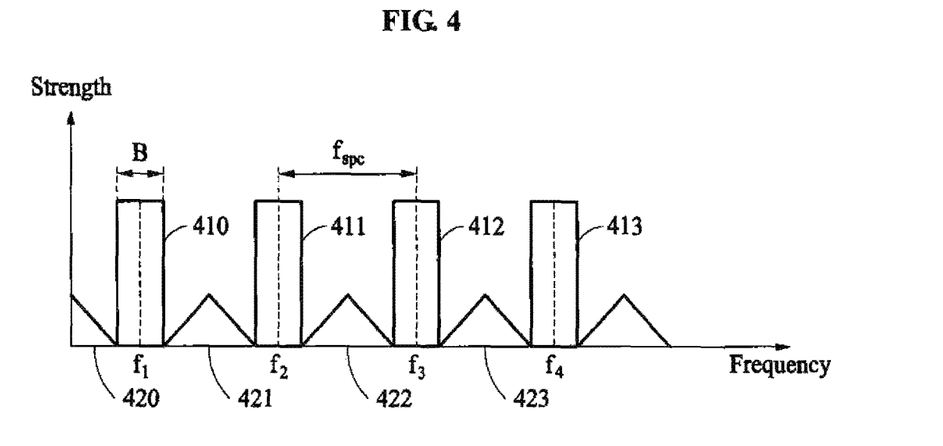
FIG. 4 is a graph illustrating another example of an intermediate frequency component of an analog optical signal generated from a modulation signal received by a host device from an RRH according to an example embodiment.

FIG. 4 is a graph illustrating another example of an intermediate frequency component of an analog optical signal generated from a modulation signal received by a host device from an RRH according to an example embodiment. Referring to FIG. 4, a host device may allocate N intermediate frequency components 410, 411, 412, and 413 respectively corresponding to N modulation signals received from RRHs to frequencies between second-order nonlinear intermodulation distortion components 420, 421, 422, and 423.

As described above with reference to FIG. 2, the second-order nonlinear intermodulation distortion components 420, 421, 422, and 423 may be separated from each other by a frequency space $f_{spc}$ between the intermediate frequency components 410, 411, 412, and 413, and each may have a signal bandwidth that is two times a signal bandwidth B of each of the intermediate frequency components 410, 411, 412, and 413. Thus, the host device may determine the frequency space $f_{spc}$ between the intermediate frequency components 410, 411, 412, and 413 to be three or more times the signal bandwidth B, such that the frequency space between the second-order nonlinear intermodulation distortion components 420, 421, 422, and 423 may be greater than or equal to the signal bandwidth B of each of the intermediate frequency components 410, 411, 412, and 413, respectively.

In addition, center frequencies of the second-order nonlinear intermodulation distortion components 420, 421, 422, and 423 may be separated by a frequency space $f_{spc}$ based on a direct current, and thus the host device may determine a center frequency $f_m$ of the intermediate frequency components 410, 411, 412, and 413 as represented by Equation 5.

$$f_m = fspc/2 + (2m-1)fspc \ (m=1,2,\ldots,N) \quad \text{[Equation 5]}$$

Thus, while generating an analog optical signal, the host device may set a frequency space between the intermediate frequency components 410, 411, 412, and 413 to be three or greater times a signal bandwidth of each of the intermediate frequency components 410, 411, 412, and 413, and allocate a center frequency of the second-order nonlinear intermodulation distortion components 420, 421, 422, and 423 which corresponds to half the frequency space between the intermediate frequency components 410, 411, 412, and 413 based on a direct current. Thus, the host device may include the intermediate frequency components 410, 411, 412, and 413 in the frequency space between the second-order nonlinear intermodulation distortion components 420, 421, 422, and 423, respectively, such that the intermediate frequency components 410, 411, 412, and 413 may avoid the second-order nonlinear intermodulation distortion components 420, 421, 422, and 423

As described above with reference to FIGS. 2 through 4, the host device may prevent an overlap between the intermediate frequency components 410, 411, 412, and 413 included in the analog optical signal, and the second-order nonlinear intermodulation distortion components 420, 421, 422, and 423 and harmonic components. Further, the host device may combine the analog optical signal with a frequency component that compensates for the second-order nonlinear intermodulation distortion components 420, 421, 422, and 423 and the harmonic components.

Figure 5:
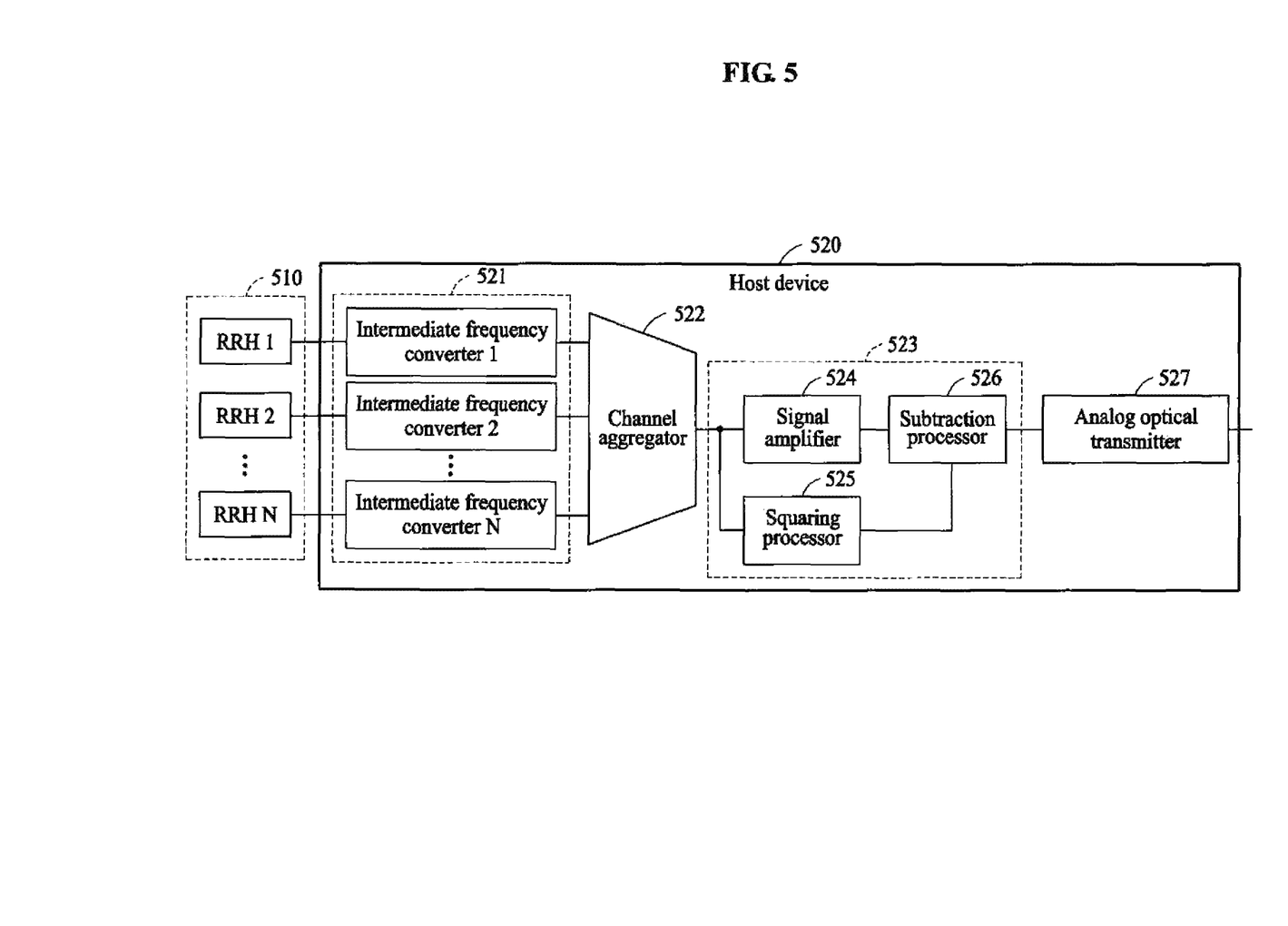
FIG. 5 is a diagram illustrating an example of a configuration of a host device according to an example embodiment.

FIG. 5 is a diagram illustrating an example of a configuration of a host device according to an example embodiment.

Referring to FIG. 5, a host device 520 may receive an analog electrical signal from at least one RRH. In the example illustrated in FIG. 5, N different analog electrical signals are received from N RRHs 510. The N RRHs 510 transmit the N analog electrical signals to the host device 520 using different frequencies. The N analog electrical signals received from the N RRHs 510 may include a mobile signal to be provided to a user terminal connected to the host device 520.

In this example, the host device 520 includes N intermediate frequency converters 521 respectively corresponding to the N RRHs 510. Each of the N intermediate frequency converters 521 may convert a frequency of a received analog electrical signal to an intermediate frequency to be used in an analog, optical link connected to the host device 520, for example, an analog optical link of a DAS. That is, each of the N intermediate frequency converters 521 may allocate an analog electrical signal to a corresponding intermediate frequency. Herein, the intermediate frequency may be set to match each of the N RRHs 510. Thus, each of the N intermediate frequency converters 521 respectively corresponding to the N RRHs 510 may convert a frequency of a corresponding analog electrical signal to an intermediate frequency corresponding to a corresponding RRH.

As described above with reference to FIGS. 2 through 4, N intermediate frequencies used by the N intermediate frequency converters 521 may be set not to overlap a second-order nonlinear intermodulation distortion component and a harmonic component. For example, the N intermediate frequencies may be included in a frequency range that satisfies Equation 4 above. For another example, the N intermediate frequencies may be included between second-order nonlinear intermodulation distortion components based on a signal bandwidth of each of the N intermediate frequencies and a frequency space between the N intermediate frequencies.

The host device 520 also includes a channel aggregator 522 configured to multiplex the analog electrical signals having the intermediate frequency which are output from the N intermediate frequency converters 521. The channel aggregator 522 may combine respective signal paths of the N intermediate frequency converters 521 to be a single signal path. An analog electrical signal to be output from the channel;aggregator 522 may include N intermediate frequency components respectively corresponding to the N intermediate frequency converters 521.

To remove a second-order nonlinear intermodulation distortion component and a harmonic component that may be generated in the analog optical link connected to the host device 520, the host device 520 also includes a precompensator 523 configured to perform a precompensation on the analog electrical signal obtained through the multiplexing performed by the channel aggregator 522. The precompensator 523 includes a plurality of signal paths that processes the analog electrical signal differently from each other. One of the signal paths may generate a frequency component corresponding to the second-order nonlinear intermodulation distortion component and the harmonic component that may be generated in the analog optical link.

The precompensator 523 also includes a squaring processor 525 configured to perform a squaring process on the multiplexed analog electrical signal. The squaring processor 525 may be included in one of the signal paths. The squaring processor 525 may use a square function to obtain the second nonlinear intermodulation distortion component and the harmonic component corresponding to the multiplexed analog electrical signal. For example, when the multiplexed analog electrical signal is a function x(t) with respect to time t, the squaring processor 525 may change an amplitude and a phase of the analog electrical signal using a square function $\{x(t)\}^2$. The squaring processor 525 may obtain the second-order nonlinear intermodulation distortion component and the harmonic component from a signal of which an amplitude and a phase are squared from those, of the analog electrical signal.

As described above with reference to FIG. 2, the squaring processor 525 may obtain the second-order nonlinear intermodulation distortion component corresponding to the multiplexed analog electrical signal based on a relationship between an intermediate frequency of the analog electrical signal and, a frequency of the second-order nonlinear intermodulation distortion component. Similarly, as described above with reference to FIG. 2, the squaring processor 525 may also obtain the harmonic component corresponding to the multiplexed analog electrical signal based on a relationship between the intermediate frequency of the analog electrical signal and a frequency of the harmonic component.

The precompensator 523 also includes a signal amplifier 524 configured to amplify the multiplexed analog electrical signal. The signal amplifier 524 may be included in one of the signal paths. The signal amplifier 524 may be an RF amplifier configured to amplify the analog electrical signal used to generate a radio signal to be provided to the user terminal through the DAS. The signal amplifier 524 may amplify a magnitude of the analog electrical signal based on a magnitude of the radio signal. Herein, the magnitude of the radio signal may be determined based on an antenna standard required for the DAS. The signal amplifier 524 and the squaring processor 525 may be included in different signal paths, and independently process the multiplexed analog electrical signal.

The precompensator 523 also includes a subtraction processor 526 configured to subtract, from the analog electrical signal amplified by the signal amplifier 524, the second-order nonlinear intermodulation distortion component and the harmonic component which are obtained by the squaring processor 525. The subtraction processor 526 may combine different signal paths, for example, the signal path including the signal amplifier 524 and the signal path including the squaring processor 525, using a subtraction operation. Since the subtraction operation is used, an analog electrical signal output from the subtraction processor 526 may have same absolute values of a frequency and an amplitude as those of the second-order nonlinear intermodulation distortion component. However, a sign of the amplitude thereof may be opposite to that of the second-order nonlinear intermodulation distortion component. Similarly, the analog electrical signal output from the subtraction processor 526 may have same absolute values of a frequency and an amplitude as those of the harmonic component. However, a sign of the amplitude thereof may be opposite to that of the harmonic component The host device 520 also includes an analog optical transmitter 527 configured to convert the analog electrical signal output from the precompensator 523 to an analog optical signal to be used in the analog optical link connected to the host device 520. The analog optical transmitter 527 may convert the analog electrical signal to the analog optical signal using a laser diode. The analog optical signal output from the analog optical transmitter 527 may be transmitted to another host device connected to the host device 520, for example, the RHU 140 of FIG. 1, or an antenna configured to transmit the radio signal to the user terminal. Thus, the analog optical signal output from the analog optical transmitter 527 may be used to generate the radio signal to be provided to the user terminal.

The analog electrical signal transmitted from the precompensator 523 to the analog optical transmitter 527 may be the analog electrical signal output from the subtraction processor 526. Thus, the analog optical signal output from the analog optical transmitter 527 may include a frequency component, for example, the frequency component having the same absolute values of the frequency and the amplitude with the opposite sign of the amplitude, which compensates for the second-order nonlinear intermodulation distortion component and the harmonic component generated in the analog optical link. Thus, the second-order nonlinear intermodulation distortion component and the harmonic component generated in the analog optical link may be combined with the frequency component included in the analog optical signal, and thus the second-order nonlinear intermodulation distortion component and the harmonic component may be compensated for in advance. That is, the subtraction processor 526 may remove, in advance, the second-order nonlinear intermodulation distortion component and the harmonic component that may be generated in the analog optical link by using the subtraction operation.

The operations of the precompensator 523 described above may be performed on a digital electrical signal in addition to an analog electrical signal. Hereinafter, how a precompensation is performed on a digital electrical signal will be described with reference to FIG. 6.

Figure 6:
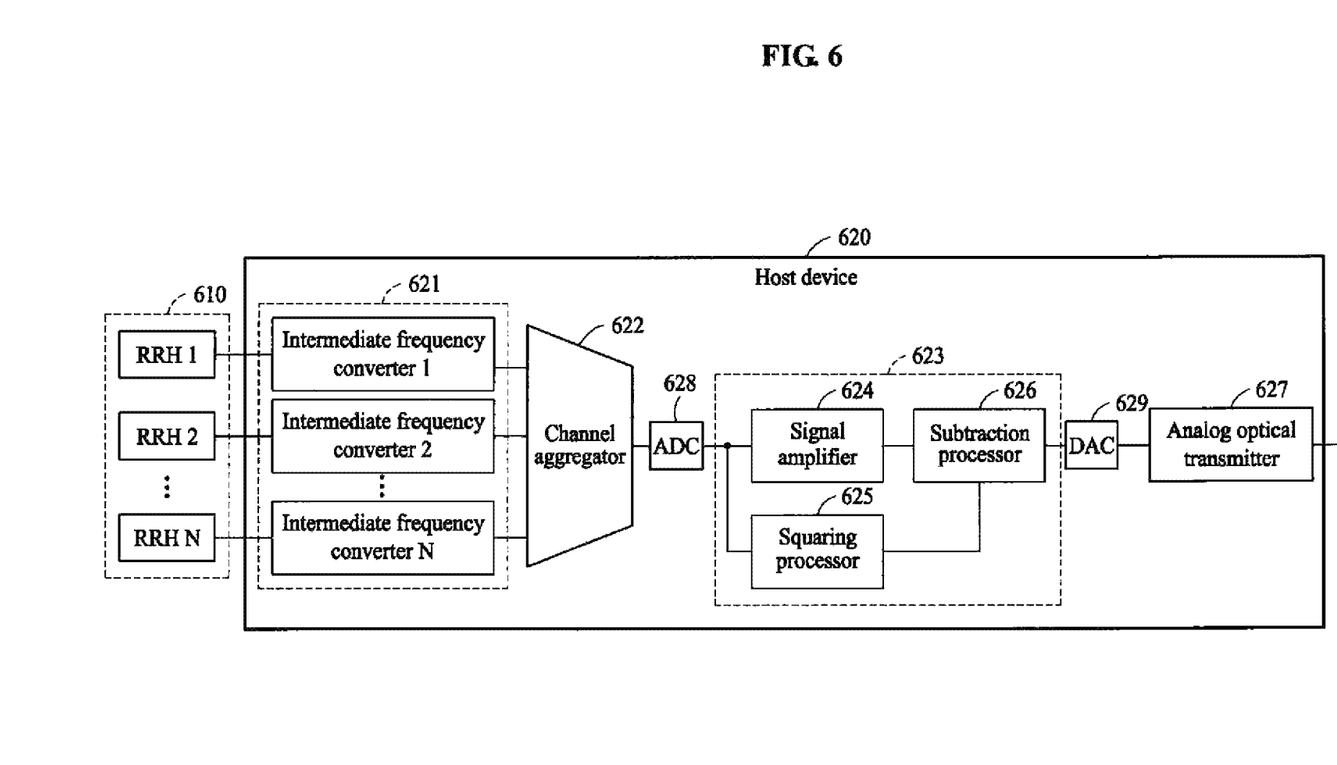
FIG. 6 is a diagram illustrating another example of a configuration of a host device according to an example embodiment.

FIG. 6 is a diagram illustrating another example of a configuration of a host device according to an example embodiment.

Referring to FIG. 6, a host device 620 inputs N different analog electrical signals respectively received from N RRHs 610 to N intermediate frequency converters 621 respectively corresponding to the N RRHs 610. For a detailed description of how the N intermediate frequency converters 621 convert frequencies of the N analog electrical signals corresponding to the N RRHs 610 to intermediate frequencies respectively corresponding to the N RRHs 610, reference may be made to the description provided above with reference to FIG. 5. As described above with reference to FIGS. 2 through 4, an intermediate frequency may be determined not to overlap a second-order nonlinear intermodulation distortion component and a harmonic component. Herein, analog electrical signals output from the N intermediate frequency converters 621 may be multiplexed by a channel aggregator 622.

The host device 620 includes an analog-to-digital converter (ADC) 628 configured to convert, to a digital electrical signal, an analog electrical signal obtained through the multiplexing performed by the channel aggregator 622. The digital electrical signal output from the ADC 628 may include N intermediate frequency components respectively corresponding to the N intermediate frequency converters 621.

To remove a second order nonlinear intermodulation distortion component and a harmonic component which may be generated in an analog optical link connected to the host device 620, the host device 620 also includes a precompensator 623 configured to perform a precompensation on the digital electrical signal. The precompensator 623 may include a plurality of signal paths that process the digital electrical signal differently. Herein, one of the signal paths may generate a frequency component corresponding to the second-order nonlinear intermodulation distortion component and the harmonic component which may be generated in the analog optical link.

The precompensator 623 also includes a squaring processor 625 configured to perform a squaring process on the digital electrical signal. The squaring processor 625 may be included in one of the signal paths. The squaring processor 625 may obtain the second-order nonlinear intermodulation distortion component and the harmonic component corresponding to the digital electrical signal. As described above with reference to FIG. 2, the squaring processor 625 may obtain the second-order nonlinear intermodulation distortion component, corresponding to the digital electrical signal based on a relationship between an intermediate frequency of the analog electrical signal and a frequency of the second-order nonlinear intermodulation distortion component. Similarly, as described above with reference to FIG. 2, the squaring processor 625 may obtain the harmonic component corresponding to the digital electrical signal based on a relationship between the intermediate frequency of the analog electrical signal and a frequency of the harmonic component.

The precompensator 623 also includes a signal amplifier 624 configured to amplify the digital electrical signal. The signal amplifier 624 may be included in one of the signal paths. The signal amplifier 624 may be an RF amplifier configured to amplify the digital electrical signal based on a magnitude of a radio signal to be provided to a user terminal through a DAS. Herein, the magnitude of the radio signal may be determined based on, an antenna standard for a magnitude of a radio signal, to be received by the user terminal or a magnitude of a radio signal required by the DAS. The signal amplifier 624 and the squaring processor 625 may be included in different signal paths and process the digital electrical signal independently from each other.

The precompensator 623 also includes a subtraction processor 626 configured to subtract, from the digital electrical signal amplified by the signal amplifier 624, the second-order nonlinear intermodulation distortion component and the harmonic component obtained by the squaring processor 625. The subtraction processor 626 may combine different signal paths, for example, the signal path including the signal amplifier 624 and the signal path including the squaring processor 625, using a subtraction operation. Since the subtraction operation is used, a digital electrical signal output from the subtraction processor 626 may have same absolute values of a frequency and an amplitude as those of the second-order nonlinear intermodulation distortion component. However, a sign of the amplitude thereof may be opposite to that of the second-order nonlinear intermodulation distortion component. Similarly, the digital electrical signal output from the subtraction processor 626 may have same absolute values of a frequency and an amplitude as those of the harmonic component. However, a sign of the amplitude thereof may be opposite to that of the harmonic component.

The host device 620 also includes a digital-to-analog converter (DAC) 629 configured to convert, to an analog electrical signal, the digital electrical signal obtained through the precompensation performed by the precompensator 623. Thus, a frequency component in a digital domain generated in the precompensator 623 that precompensates the second-order nonlinear intermodulation distortion component and the harmonic component may be converted to a frequency component in an analog domain.

The host device 620 also includes an analog optical transmitter 627 configured to convert the analog electrical signal output from the DAC 629 to an analog optical signal to be used in the analog optical link connected to the host device 620. The analog optical signal output from the analog optical transmitter 627 may be transmitted to another host device connected to the host device 620, for example, the RHU 140 of FIG. 1, or an antenna configured to transmit the radio signal to the user terminal. Thus, the analog optical signal output from the analog optical transmitter 627 may be used to generate the radio signal to be provided to the user terminal.

As described above, according to, an example embodiment, a host device may use an intermediate frequency to avoid or prevent a second-order nonlinear intermodulation distortion component and a harmonic component that may be generated in an analog optical link connected to the host device, for example, an analog optical link of a DAS. Further, the host device may precompensate for the second-order nonlinear intermodulation distortion component and the harmonic component that may be generated in the analog optical link.

According to example embodiments described herein, it is possible to provide a mobile communication service to a terminal present indoors.

According to example embodiments described herein, it is possible to effectively accommodate data traffic of a terminal present indoors using an analog optical link.

According to example embodiments described herein, it is possible to use an intermediate frequency set to prevent a distortion of an optical signal from occurring due to nonlinear noise generated in an analog optical link.

According to example embodiments described herein, it is possible to precompensate for nonlinear noise that may be generated in an analog optical link.

The components described in the example embodiments of the present disclosure may be achieved by hardware components including at least one of a digital signal processor (DSP), a processor, a controller, an application specific integrated circuit (ASIC), a programmable logic element such as a field programmable gate array (FPGA), other electronic devices, and combinations thereof. At least some of the functions or the processes described in the example embodiments of the present disclosure may be achieved by software, and the software may be recorded on a recording medium. The components, the functions, and the processes described in the example embodiments of the present disclosure may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in, a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of processing an analog electrical signal to be performed by a host device connected to remote radio heads (RRHs), the method comprising:
   receiving analog electrical signals respectively from the RRHs;
   allocating, to an intermediate frequency, the analog electrical signals by intermediate frequency converters respectively corresponding to the RRHs;
   multiplexing, by a channel aggregator, the analog electrical signals allocated to the intermediate frequency;
   performing, by a precompensator, a precompensation on an analog electrical signal obtained through the multiplexing to remove a second-order nonlinear intermodulation distortion component and a harmonic component with a frequency greater than or equal to the intermediate frequency which are generated in an analog optical link connected to the host device; and
   converting, by an analog, optical transmitter, an analog electrical signal obtained through the precompensation to an analog optical signal to be output to the analog optical link.

2. The method of claim 1, wherein the performing of the precompensation comprises:
   obtaining the second-order nonlinear intermodulation distortion component and the harmonic component from the multiplexed analog electrical signal by distributing the multiplexed analog electrical signal to different signal paths.

3. The method of claim 1, wherein the performing of the precompensation comprises:
   amplifying, by a signal amplifier, the multiplexed analog electrical signal;
   obtaining, by a squaring processor, the second-order nonlinear intermodulation distortion component and the harmonic component corresponding to the multiplexed analog electrical signal; and
   subtracting, by a subtraction processor, the second-order nonlinear intermodulation component and the harmonic component from the amplified analog electrical signal.

4. The method of claim 1, wherein the intermediate frequency is set to correspond to each of the analog electrical signals and is determined based on a frequency space between the analog electrical signals, a bandwidth of each of the analog electrical signals, and a smallest center frequency among center frequencies of the analog electrical signals.

5. A method of processing an analog electrical signal to be performed by a host device connected to remote radio heads (RRHs), the method comprising:
   receiving analog electrical signals respectively from the RRHs;
   allocating, to an intermediate frequency, the analog electrical signals by intermediate frequency converters respectively corresponding to the RRHs;
   multiplexing, by a channel aggregator, the analog electrical signals allocated to the intermediate frequency;
   converting, by an analog-to-digital converter (ADC), an analog electrical signal obtained through the multiplexing to a digital electrical signal;
   performing, by a precompensator, a precompensation on the digital electrical signal to remove a second-order nonlinear intermodulation distortion component and a harmonic component with a frequency greater than or equal to the intermediate frequency which are generated in an analog optical link connected to the host device;
   converting, by a digital-to-analog converter (DAC), a digital electrical signal obtained through the precompensation to an analog electrical signal; and
   converting, by an analog optical transmitter, the analog electrical signal obtained through the converting to an analog optical signal to be output to the analog optical link.

6. The method of claim 5, wherein the performing of the precompensation comprises:
   obtaining the second-order nonlinear intermodulation distortion component and the harmonic component from the digital electrical signal by distributing the digital electrical signal to different signal paths.

7. The method of claim 5, wherein the performing of the precompensation comprises:
   amplifying, by a signal amplifier, the digital electrical signal;
   obtaining, by a squaring processor, the second-order nonlinear intermodulation distortion component and the harmonic component corresponding to the digital electrical signal; and
   subtracting, by a subtraction processor, the second-order nonlinear intermodulation distortion component and the harmonic component from the amplified digital electrical signal.

8. The method of claim 5, wherein the intermediate frequency is set to correspond to each of the analog electrical signals and is determined based on a frequency space between the analog electrical signals, a bandwidth of each of the analog electrical signals, and a smallest center frequency among center frequencies of the analog electrical signals.

9. A host device connected to remote radio heads (RRHs), comprising:
   intermediate frequency converters respectively corresponding to the RRHs, and each configured to convert a frequency of an analog electrical signal received from a corresponding RRH of the RRHs to an intermediate frequency corresponding to the RRH;
   a channel aggregator configured, to multiplex analog electrical signals output from the intermediate frequency converters;
   a precompensator configured to perform a precompensation on an analog electrical signal obtained through the multiplexing to remove a second-order nonlinear intermodulation distortion component and a harmonic component with a frequency greater than or equal to the intermediate frequency which are generated in an analog optical link connected to the host device; and
   an analog optical transmitter configured to convert an analog electrical signal obtained through the precompensation to an analog optical signal to be output to the analog optical link.

10. The host device of claim 9, wherein the precompensator comprises:
   a signal amplifier configured to amplify the multiplexed analog electrical signal;
   a squaring processor configured to obtain the second-order nonlinear intermodulation distortion component and the harmonic component corresponding to the multiplexed analog electrical signal; and
   a subtraction processor configured to subtract the second-order nonlinear intermodulation distortion component and the harmonic component from the amplified analog electrical signal.

11. The host device of claim 9, wherein the intermediate frequency is set to correspond to each of the analog electrical signals and is determined based on a frequency space between the analog electrical signals, a bandwidth of each of the analog electrical signals, and a smallest center frequency among center frequencies of the analog electrical signals.

* * * * *